United States Patent
Nugent et al.

(10) Patent No.: US 7,039,553 B2
(45) Date of Patent: May 2, 2006

(54) PHASE DETERMINATION OF A RADIATION WAVE FIELD

(75) Inventors: Keith Nugent, North Fitzroy (AU); David Paganin, North Carlton (AU); Anton Barty, Brunswick (AU)

(73) Assignee: The University of Melbourne, (AU)

( * ) Notice: Subject to any disclaimer, the term of this patent is extended or adjusted under 35 U.S.C. 154(b) by 0 days.

(21) Appl. No.: 10/979,554

(22) Filed: Nov. 2, 2004

(65) Prior Publication Data
US 2005/0062957 A1    Mar. 24, 2005

Related U.S. Application Data

(62) Division of application No. 09/830,393, filed as application No. PCT/AU99/00949 on Nov. 1, 1999, now Pat. No. 6,885,442.

(30) Foreign Application Priority Data
Nov. 2, 1998 (AU) .................................. PP6900

(51) Int. Cl.
   *G06F 19/00* (2006.01)
(52) U.S. Cl. ....................... 702/182; 356/121
(58) Field of Classification Search ............ 702/182, 702/183–185, 188; 356/121–127, 451, 435, 356/520; 359/845–849; 250/306, 331
See application file for complete search history.

(56) References Cited

U.S. PATENT DOCUMENTS

| 4,309,602 A | * | 1/1982 | Gonsalves et al. ........ 250/201.9 |
| 4,690,555 A | * | 9/1987 | Ellerbroek ................... 356/121 |
| 4,953,188 A | | 8/1990 | Siegel et al. ................... 378/43 |
| 5,004,918 A | | 4/1991 | Tsuno et al. ................. 250/311 |
| 5,298,747 A | | 3/1994 | Ichikawa et al. ........... 250/306 |

(Continued)

FOREIGN PATENT DOCUMENTS
WO    WO 96/31098    10/1996

(Continued)

OTHER PUBLICATIONS

Barty et al., "Quantitative Optical Phase-Amplitude Microscopy", Conference paper, XI Conference of the Australian Optical Society, (Dec. 1997).

(Continued)

*Primary Examiner*—Edward Raymond
(74) *Attorney, Agent, or Firm*—Fish & Richardson, P.C.

(57) ABSTRACT

A method and apparatus for quantitative determination of the phase of a radiation wave field is disclosed. A representative measure of the rate of change of intensity of the radiation wave field over a selected surface extending generally across the wave field is transformed to produce a first integral transform representation. A first filter is applied to the first integral transform representation corresponding to the inversion of a first differential operator reflected in the measure of rate of change of intensity to produce a first modified integral transform representation. An inverse of the first integral transform is applied to the first modified integral transform representation to produce an untransformed representation. The untransformed representation is corrected based on a measure of intensity over said selected surface and again transformed to produce a second integral transform representation. A second filter is applied to the second integral transform representation corresponding to the inversion of a second differential operator reflected in the corrected untransformed representation to produce a second modified integral transform representation. An inverse of the second integral transform is applied to the second modified integral transform representation to produce a measure of phase of the radiation wave field across the selected plane.

4 Claims, 12 Drawing Sheets

U.S. PATENT DOCUMENTS

| | | | | |
|---|---|---|---|---|
| 5,367,375 | A | * 11/1994 | Siebert | 356/520 |
| 5,633,714 | A | 5/1997 | Nyyssonen | 356/359 |
| 5,715,291 | A | 2/1998 | Momose et al. | 378/84 |
| 5,841,125 | A | * 11/1998 | Livingston | 250/201.9 |
| 6,219,142 | B1 | * 4/2001 | Kane | 356/450 |

FOREIGN PATENT DOCUMENTS

WO    WO 98/28950    7/1998

OTHER PUBLICATIONS

Barty et al., Quantitative Optical Phase Microscopy, (1998), Opt. Lett. (in press).

Barty et al., "Quantitative Optical Phase-Amplitude Microscopy", Conference paper, Focus on Microscopy, (Apr. 1998).

Gureyev et al., "Partially coherent fields, the transport-of-intensity equation, and phase uniqueness" J. Opt.Soc.Am. vol. 12 1942-1946.

Gureyev et al., "Phase retrieval with the transport-of-intensity equation. II. Orthogonal series solution for nonuniform illumination", J. Opt. Soc. Am. vol. 13 1670-1682.

Gureyev et al., "Phase retrieval with the transport-of-intensity equation: matrix solution with the use of Zernlike polynomials", J. Opt. Soc. Am, vol. 12 1932-1941.

Gureyev et al., "Rapid phase retrieval using the Fast Fourrier Transform" Adaptive Optics, vol. 23, 1995 Technical Digest Series (Optical Society of America, Washington, D.C., 1995) pp 77-79.

Gureyev et al., "Rapid quantitative phase imaging using the transport of intensity equation", (1997), 133 Opt. Comm. 339-346.

N. Streibl, "Phase imaging by the transport of intensity equation", (1984), 49 Opt. Comm. 6.

Nugent et al., "Quantitative phase imaging using hard X-rays", (1996), 77 Phys. Rev. Lett. 2961-2964.

Paganin et al., "Noninterferometric phase imaging with partially coherent light", (1998), 80 Phys. Rev. Lett. 2586-2589.

Paganin et al., "Non-interferometric phase imaging with partially coherent radiation", Conference paper, XI Conference of the Australian Optical Society, (Dec. 1997).

Wilkins et al., "Phase-contrast imaging using polychromatic hard X-rays", (1996), 384 Nature 335.

* cited by examiner (a) aperture plane intensity (b) aperture plane phase (c) negative defocus intensity (d) positive defocus intensity (e) intensity derivative (f) recovered phase (a) intensity, z = 0 mm (b) phase, z = 0 mm (c) intensity, z = 199 mm (d) intensity, z = 200 mm (e) intensity, z = 201 mm (f) retrieved phase, z = 200 mm (g) backpropagated intensity, z = 0 mm (h) backpropagated phase, z = 0 mm

PHASE DETERMINATION OF A RADIATION WAVE FIELD

RELATED APPLICATIONS

This application is a divisional and claims the benefit of priority under 35 USC 120 of U.S. application Ser. No. 09/830,393, filed Jun. 7, 2001 now U.S. Pat No. 6,885,442. The disclosure of the prior application is considered part of (and is incorporated by reference in) the disclosure of this application. This application also claims priority under 35 USC 119 of application serial numbers PCT/AU99/00949 filed Nov. 1, 1999 and Australia PP6900 filed Nov. 2, 1998.

FIELD OF THE INVENTION

This invention relates to the determination of phase of a radiation wave field. The invention also relates to a range of applications in which phase information about a radiation wave field can be used. As used in this specification the term "radiation wave field" is intended to include all forms of radiation that propagate in a wave like manner including but not limited to examples such as X-rays, visible light and electrons.

BACKGROUND OF THE INVENTION

Techniques for the measurement of the phase of a radiation wave field have many applications in fundamental physics and as a basis for a number of measurement techniques involving various physical properties. Examples of applications of phase measurement techniques include the fields of x-ray imaging, electron microscopy, optical microscopy as well as optical tomography and x-ray phase tomography.

Phase is typically measured using interferometers of various types. The key feature of interferometry is the ability to quantitatively measure the phase of a wave field. Whilst interferometry based techniques retain significant importance it has been recognised that non-interferometric techniques may be used to provide phase information. A number of non-interferometric approaches involve attempting to solve a transport of intensity equation for a radiation wave field. This equation relates the irradiance and phase of a paraxial monochromatic wave to its longitudinal irradiance derivative and is described in M. R. Teague, "Deterministic Phase Retrieval: A Green's Function Solution" J. Opt. Soc. Am. 73 1434–1441 (1983). The article "Phase imaging by the transport of intensity equation" by N. Streibl, Opt. Comm. 49 6–10 (1984), describes an approach based on the transport of intensity equation by which phase structure can be rendered visible by the use of defocus and digital subtraction of intensity data obtained at various defocused distances. This approach only provides for phase visualisation and does not provide for the measurement of phase shift. Another approach based on solving the transport of intensity equation is disclosed in T. E. Gureyev, K. A. Nugent, D. Paganin and A. Roberts, "Rapid phase retrieval using a Fast Fourier transform", Adaptive Optics, Volume 23, (1995) Optical Society of America Technical Digest Series, page 77–79 and T. E. Gureyev and K. A. Nugent, "Rapid quantitative phase imaging using the transport of intensity equation", Opt. Comm., 133 339–346 (1997). This approach allows the phase of a light field to be recovered from two closely spaced intensity measurements when an illuminating beam has an arbitrary, but everywhere non zero intensity distribution limited by rectangular aperture. Whilst this approach can be used for non-uniform intensity distributions the extent of the non uniformity is limited and introduces significant computational complexity. Consequently this approach is not able to cope with non uniformities introduced by some sample absorption profiles or in some intensity illumination distributions. This approach is strictly also only applicable to coherent wave fields.

The article K. A. Nugent, T. E. Gureyev, D. F. Cookson, D. Paganin and Z. Barnea "Quantitative phase imaging using hard X-rays" (1996) 77 Phys. Rev. Lett. 2961–2964 is also based on a solution to the transport of intensity equation. Again the technique described cannot be applied to a non-uniform intensity distribution.

Other approaches based on a solution to the transport of intensity equation limited to a requirement of uniformity are described in T. E. Gureyev, K. A. Nugent, A. Roberts "Phase retrieval with the transport-of-intensity equation: matrix solution with the use of Zernike polynomials" J. Opt. Soc. Am. A Vol 12, 1932–1941 (1995) and T. E. Gureyev, A. Roberts and K. A. Nugent "Partially coherent fields, the transport-of-intensity equation, and phase uniqueness", J. Opt. Soc. Am. A Vol 12, 1942–1946 (1995).

A technique for recovery of phase in the case of non-uniform illumination is described in T. E. Gureyev and K. A. Nugent "Phase retrieval with the transport-of-intensity equation. II. Orthogonal series solution for nonuniform illumination", J. Opt. Soc. Am. A Vol 13, 1670–1682 (1996). This approach is based on a method of orthogonal expansions and can be computationally complex in implementation. In many applications this complexity makes the technique impractical.

DISCLOSURE OF THE INVENTION

The present invention provides a non-interferometric method and apparatus for the measurement of phase. In combination with a direct measurement of intensity a measurement of phase allows the phase and intensity at any other plane in the radiation wave field to be determined using known techniques. The invention also provides the basis for a number of measurement techniques.

In accordance with a first aspect of the invention there is provided a method of quantitative determination of the phase of a radiation wave field including the steps of (a) producing a representative measure of the rate of change of intensity of said radiation wave field over a selected surface extending generally across the wave field;

(b) producing a representative measure of intensity of said radiation wave field over said selected surface;

(c) transforming said measure of rate of change of intensity to produce a first integral transform representation and applying to said first integral transform representation a first filter corresponding to the inversion of a first differential operator reflected in said measure of rate of change of intensity to produce a first modified integral transform representation;

(d) applying an inverse of said first integral transform to said first modified integral transform representation to produce an untransformed representation;

(e) applying a correction based on said measure of intensity over said selected surface to said untransformed representation;

(f) transforming the corrected untransformed representation to produce a second integral transform representation and applying to said second integral transform representation a second filter corresponding to the inversion of a second differential operator reflected in the corrected untransformed representation to produce a second modified integral transform representation;

(g) applying an inverse of said second integral transform to said second modified integral transform representation to produce a measure of phase of said radiation wave field across said selected plane.

In accordance with a second aspect of the invention there is provided an apparatus for quantitative determination of the phase of a radiation wave field including (a) means to produce a representative measure of the rate of change of intensity of said radiation wave field over a selected surface extending generally across the direction of propagation;

(b) means to produce a representative measure of intensity of said radiation wave field over said selected surface;

(c) processing means to sequentially (I) transform said measure of rate of change of intensity to produce a first integral transform representation;

(II) apply to said first integral transform representation a first filter corresponding to the inversion of a first differential operator reflected in said measure of rate of change of intensity to produce a first modified integral transform representation;

(III) apply an inverse of said first integral transform to said first modified integral transform representation to produce an untransformed representation;

(IV) apply a correction based on said measure of intensity over said selected surface to said untransformed representation;

(V) transform the corrected untransformed representation to produce a second integral transform representation;

(VI) apply to said second integral transform representation a second filter corresponding to the inversion of a second differential operator reflected in the corrected untransformed representation to produce a second modified integral transform representation; and (VII) apply an inverse of said second integral transform to said second modified integral transform representation to produce a measure of phase of said radiation wave field across said selected plane.

The selected surface can take any form that extends across the direction of propagation of the radiation including planar, part-spherical and part-cylindrical surfaces.

The first and second integral transforms can be of any suitable type and include approximations employed for computational convenience, speed or efficiency.

The first and second integral transforms are preferably produced using a Fourier transform. More preferably, the transform is a Fast Fourier transform. The method and apparatus of this invention provide for determination of phase of a radiation wave field in a manner that is computationally significantly less complex than prior art approaches. This results in significantly lower computation times. In some examples computation times improved by many orders of magnitude have been achieved.

The first and second differential operators are preferably second order differential operators. In the preferred implementation of the method and apparatus the first filter is substantially the same as the second filter. It is further preferred that at least one of the first and second filters includes a correction for noise in the representative measure of intensity.

In one form of the invention the first filter can comprise selectively suppressing first higher frequencies of the first integral transform representation. In this form of the invention the second filter can comprise selectively suppressing second higher frequencies of said second integral transform representation.

The correction based on the measure of intensity over a selected surface can be a nil correction where the intensity variations are less than a predetermined selected amount.

Preferably, the measure of the rate of change of intensity and intensity distribution over the selected surface are produced from measurements of the intensity distribution over at least two surfaces extending across the wave field and spaced apart along the direction of propagation of the radiation. In another form of the invention the representative measure of rate of change intensity in the direction of radiation propagation is produced by obtaining a first representative measurement over a measurement surface extending across the direction of propagation for radiation of a first energy and obtaining a second representative measurement over said measurement surface for radiation of a second different energy. In the case of X-ray radiation, for example, the change in radiation energy can be achieved by changing the X-ray target or by suitable filtering.

The selected surface for which measurements of intensity and rate of change of intensity are produced is preferably located between two of the spaced apart surfaces over which intensity distribution is measured.

In the preferred form of the invention the selected surface and spaced apart surfaces are planar. It is further preferred that the planes are generally perpendicular to the average direction of propagation of the radiation.

The method and apparatus of this invention can be at least partly implemented using a suitably programmed computer. In particular the processing means preferably comprises a suitably programmed computer and the steps of the method are preferably performed using a suitably programmed computer. In such forms of the invention intensity input information may take the form of digitised images or data containing information from such images. In other implementations of the invention a dedicated Fast Fourier transform chip can be employed as at least part of the processing means.

The representative measure of rate of change of intensity is preferably produced by subtraction of representative measurements respectively made at locations over the spaced apart surfaces. In the preferred form of the invention the representative measures of intensity and rate of change of intensity are obtained by sampling measurements at selected locations over the surface. Preferably the sampling and measurements are made at locations defining a regular array over the surface. This can be readily achieved for example by using a CCD (charge coupled device) as the detector.

In the preferred method the direction of propagation of the radiation wave field is selected to be the z direction of a Cartesian co-ordinate system and x and y components of phase are produced separately.

In this Cartesian co-ordinate system where the z direction is the direction of propagation of the radiation, the preferred filters are of the form $$\Omega_x = \frac{(k_x^2 + k_y^2)k_x}{(k_x^2 + k_y^2)^2 + \alpha k_x^2}$$

$$\Omega_y = \frac{(k_x^2 + k_y^2)k_y}{(k_x^2 + k_y^2)^2 + \alpha k_y^2}$$

where
- $k_x$, $k_y$ are the Fourier variables conjugate to x, y and
- α is a constant determined by noise in the intensity measurements and is equal to zero for a no noise case.

The measure of rate of change of intensity is preferably multiplied by the negative of the average wave number of the radiation before the integral transformation into the Fourier domain.

The representative measure of intensity over the spaced apart surfaces can be obtained by imaging of that surface through an appropriate imaging system. That is, the intensity information may be imaged to a detector rather than measured at the surface.

The method of this invention thus provides for the quantitative and decoupled determination of phase and intensity of a radiation wave field at any surface across the direction of propagation of the radiation. From this phase and intensity determination it is possible to calculate the phase and intensity at any other surface along the direction of propagation. Accordingly, the invention provides the basis for a number of measurement techniques.

In a further aspect of the invention there is provided a method of imaging an object including the steps of
(a) exposing the object to a radiation wave field from a source;
(b) producing a representative measure of the rate of change of intensity over a selected surface extending generally across the wave field on the side of the object remote from incident radiation;
(c) producing a representative measure of intensity of said radiation wave field over said selected surface;
(d) transforming said measure of rate of change of intensity to produce a first integral transform representation and applying to said first integral transform representation a first filter corresponding to the inversion of a first differential operator reflected in said measure of rate of change of intensity to produce a first modified integral transform representation;
(e) applying an inverse of said first integral transform to said first modified integral transform representation to produce an untransformed representation;
(f) applying a correction based on said measure of intensity over said selected surface to said untransformed representation;
(g) transforming the corrected untransformed representation to produce a second integral transform representation and applying to said second integral transform representation a second filter corresponding to the inversion of a second differential operator reflected in the corrected untransformed representation to produce a second modified integral transform representation;
(h) applying an inverse of said second integral transform to said second modified integral transform representation to produce a measure of phase of said radiation wave field across said selected plane.

In a still further aspect of the invention there is provided an apparatus for imaging an object including
(a) a source to irradiate the object with a radiation wave field;
(b) means to produce a representative measure of the rate of change of intensity of said radiation wave field over a selected surface extending generally across the wave field;
(c) means to produce a representative measure of intensity of said radiation wave field over said selected surface;
(d) processing means to sequentially (I) transform said measure of rate of change of intensity to produce a first integral transform representation;
(II) apply to said first integral transform representation a first filter corresponding to inversion of a first differential operator reflected in said measure of rate of change of intensity to produce a first modified integral transform representation;
(III) apply an inverse of said first integral transform to said first modified integral transform representation to produce an untransformed representation;
(IV) apply a correction based on said measure of intensity over said selected surface to said untransformed representation;
(V) transform the corrected untransfomned representation to produce a second integral transform representation;
(VI) apply to said second integral transform representation a second filter corresponding to the inversion of a second differential operator reflected in the corrected untransformed representation to produce a second modified integral transform representation; and
(VII) apply an inverse of said second integral transform to said second modified integral transform representation to produce a measure of phase of said radiation wave field across said selected plane.

The radiation used to irradiate the object can be a planar wave field or spherical wave field or an arbitrary wave field. If it is desired to reproduce the phase in the object plane the phase wave field determined by the above method and apparatus is back propagated and the wave field used to irradiate is subtracted.

The method and apparatus of imaging substantially incorporates the determination of phase as disclosed in relation to the first and second aspects of the invention. The preferred aspects of the invention described in relation to those aspects above are also applicable to the method and apparatus of imaging.

It is possible in some applications to use a zero object to image plane distance corresponding to contact-imaging with zero propagation distance.

If desired the object can be reconstructed in the object plane by back propagating the intensity and quantitative phase information to numerically reconstruct an image of the actual object phase and intensity structure.

In other forms of the method more than two image plane intensity distribution measurements can be made to obtain a better estimate of the rate of change of intensity or intensity derivative. In this case one or both of the source to object or object to image plane distances is changed and another intensity distribution measurement is made. The procedure is repeated until the desired number of measurements is made. The measurements provide data to which a function can be fitted for the determination of rate of change of intensity.

The method of imaging an object has particular application to point projection microscopy using X-rays, visible light or electrons.

In another aspect this invention provides a method of phase amplitude imaging including the steps of
(a) irradiating an object with a radiation wave field;
(b) focussing radiation from the object through an imaging system to an imaging surface extending across the wave field propagating from the object;
(c) producing a first representative measure of intensity distribution of radiation over said imaging surface at a first focus of the imaging system;

(d) introducing a change in focus of the image on said imaging surface through the imaging system;
(e) producing a second representative measure of intensity distribution over said imaging surface; and
(e) using said first and second representative measures to produce a representative measure of intensity and a representative measure of rate of change of intensity over a selected surface extending across the wave field;
(g) transforming said measure of rate of change of intensity to produce a first integral transform representation and applying to said first integral transform representation a first filter corresponding to the inversion of a first differential operator reflected in said measure of rate of change of intensity to produce a first modified integral transform representation;
(h) applying an inverse of said first integral transform to said first modified integral transform representation to produce an untransformed representation;
(i) applying a correction based on said measure of intensity over said selected surface to said untransformed representation;
(j) transforming the corrected untransformed representation to produce a second integral transform representation and applying to said second integral transform representation a second filter corresponding to the inversion of a second differential operator reflected in the corrected untransformed representation to produce a second modified integral transform representation;
(k) applying an inverse of said second integral transform to said second modified integral transform representation to produce a measure of phase of said radiation wave field across said selected plane.

In yet another aspect of this invention there is provided an apparatus for phase amplitude imaging of an object including
a radiation wave field source to irradiate said object;
an imaging system to focus radiation from said object to an imaging surface extending across the wave field propagating from the object;
means to produce a representative measure of radiation intensity over said imaging surface;
said imaging system including selectively operable means to adjust said focus of said radiation to said imaging surface to at least a first focus and a second focus;
processing means to:
(i) produce a representative measure of intensity and a representative measure of rate of change of intensity over a selected surface extending across the wave field from representative measures of radiation intensity over said image surface at said first focus and said second focus;
(ii) transform said measure of rate of change of intensity to produce a first integral transform representation;
(iii) apply to said first integral transform representation a first filter corresponding to the inversion of a first differential operator reflected in said measure of rate of change of intensity to produce a first modified integral transform representation;
(iv) apply an inverse of said first integral transform to said first modified integral transform representation to produce an untransformed representation;
(v) apply a correction based on said measure of intensity over said selected surface to said untransformed representation;
(vi) transform the corrected untransformed representation to produce a second integral transform representation;
(vii) apply to said second integral transform representation a second filter corresponding to the inversion of a second differential operator reflected in the corrected untransformed representation to produce a second modified integral transform representation; and
(viii) apply an inverse of said second integral transform to said second modified integral transform representation to produce a measure of phase of said radiation wave field across said selected plane.

Preferably, the numerical aperture of the irradiating wave field is smaller than the numerical aperture of the imaging system.

Preferably, the imaging surface is a detector. The detector is of any suitable form, such as for example a CCD camera.

Preferably the first focus corresponds to an in focus image at the surface and the changed focus to a slightly defocussed image. Either negative or positive defocus may be used. The defocus is preferably small so that degradation in spatial resolution is minimised. In some applications more than two images may be obtained to obtain a better estimate of the rate of change of intensity.

The method and apparatus for phase amplitude imaging substantially incorporates the determination of phase as disclosed in relation to the first and second aspects of the invention. The preferred aspects of the invention described in relation to those aspects above are also applicable to the method and apparatus of imaging.

In a preferred application the method is used for quantitative phase amplitude microscopy. In this case the imaging system is a magnification system.

In the preferred form of the invention the surface is preferably planar.

The invention will now be further described by way of example only, with reference to the drawings in which.

Figure 5:
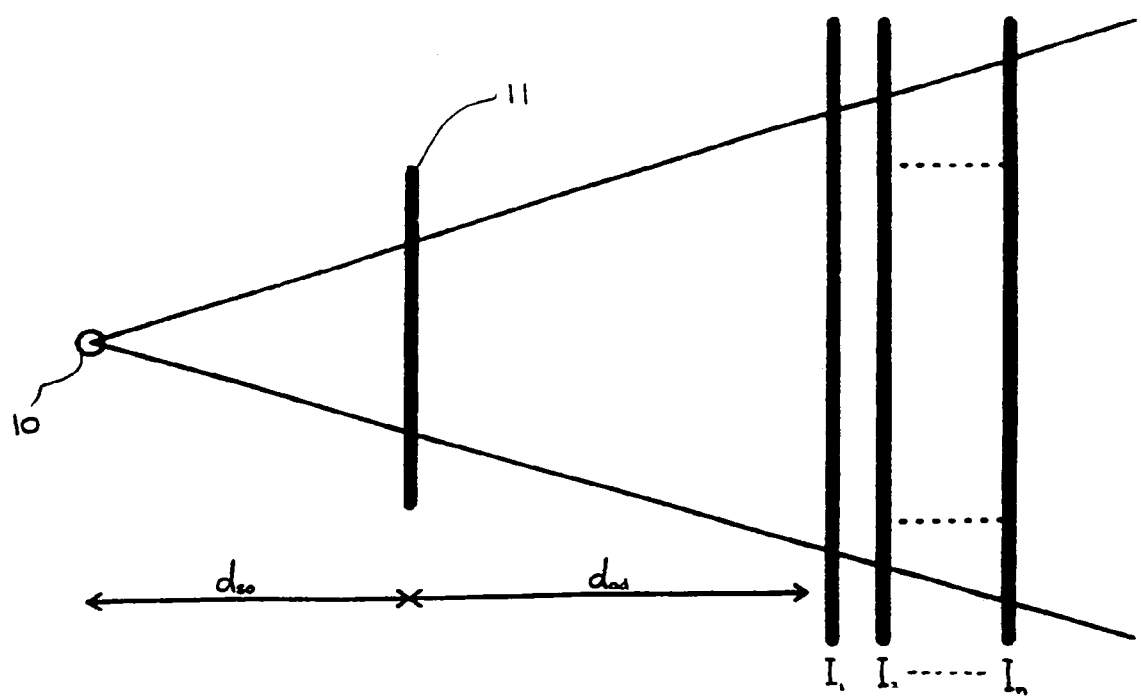
Figure 6:
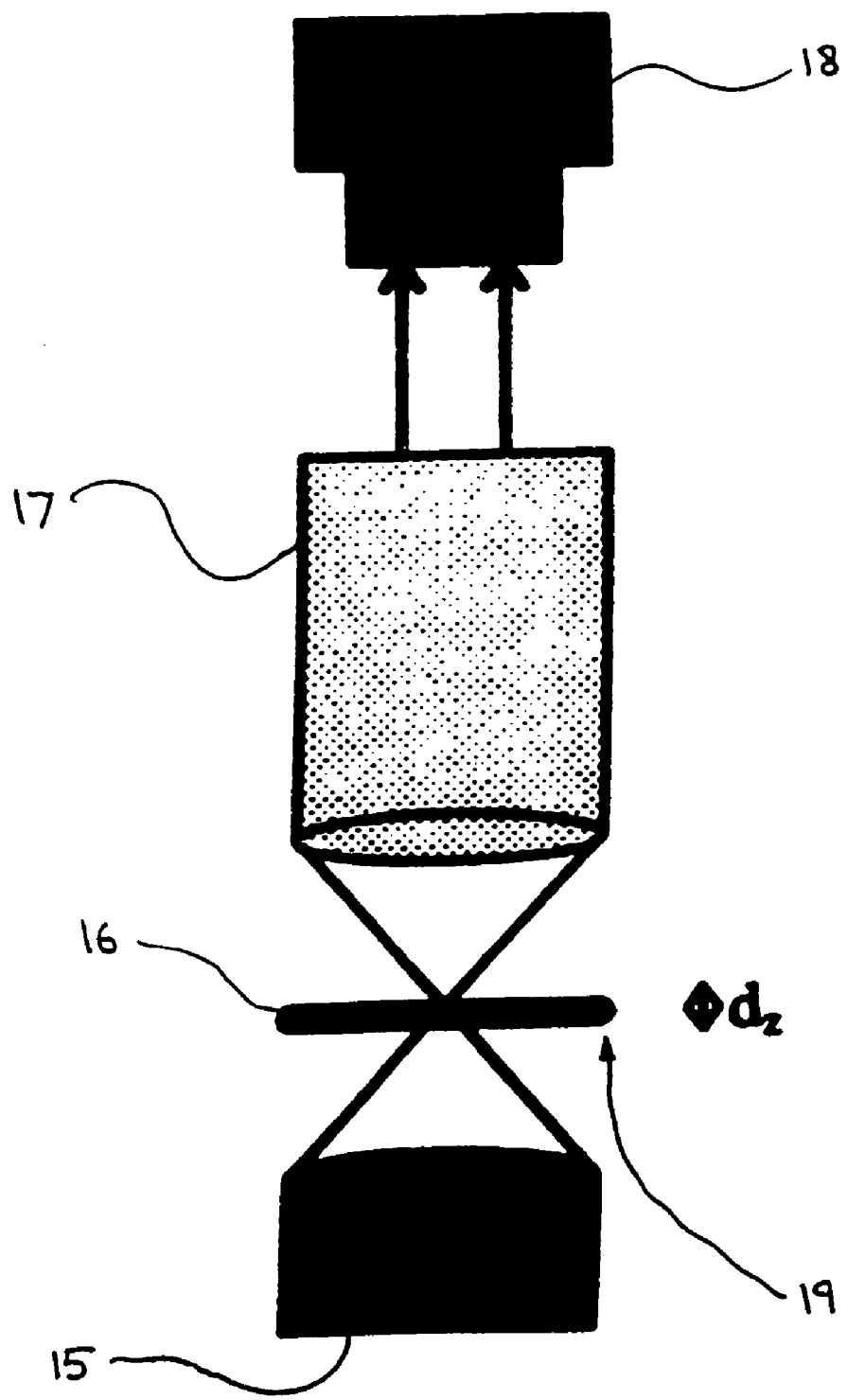
Figure 7:
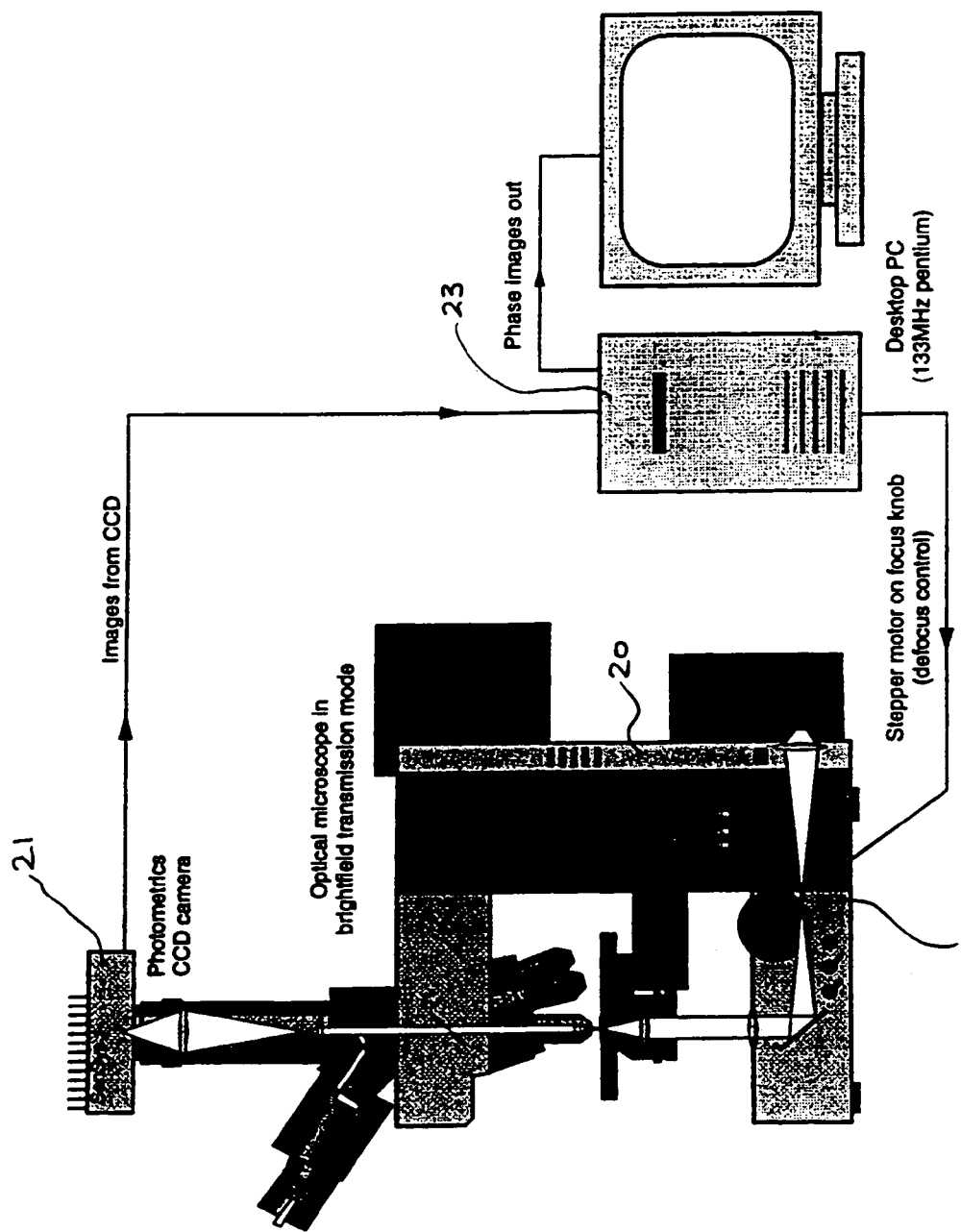
Figure 9:
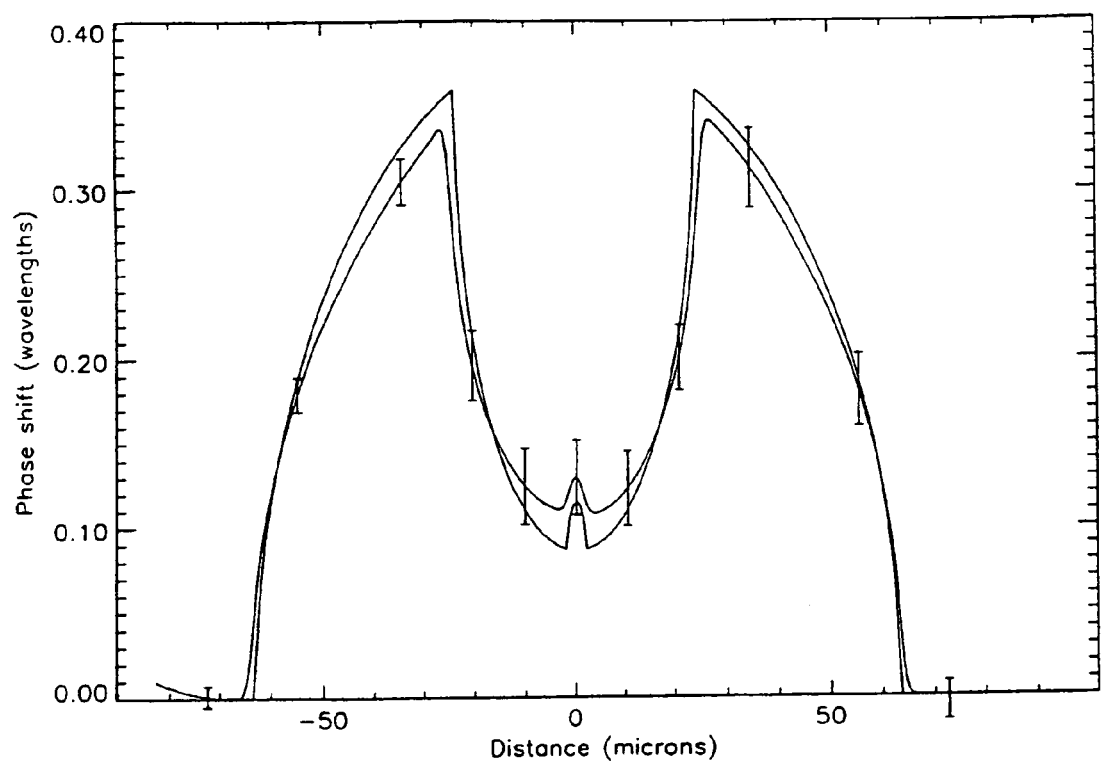

FIGS. 3(a) to (f) are simulated images illustrating phase determination for plane-wave illumination;

FIGS. 4(a) to (f) are a series of images illustrating phase determination and back propagation to another image plane;

FIG. 5 is a schematic representation of an arrangement for point projection microscopy using the method of this invention;

FIG. 6 is a schematic illustration of an arrangement for quantitative phase amplitude microscopy using the method of this invention;

FIG. 7 is a schematic drawing of an exemplary system for quantitative phase amplitude microscopy according to this invention;

FIGS. 8(a) to (d) show intensity images and phase images-obtained using the system shown in FIG. 7;

FIG. 9 is a graph showing a comparison of measured and expected phase profiles for the fibre of Example 3.

Figure 10:
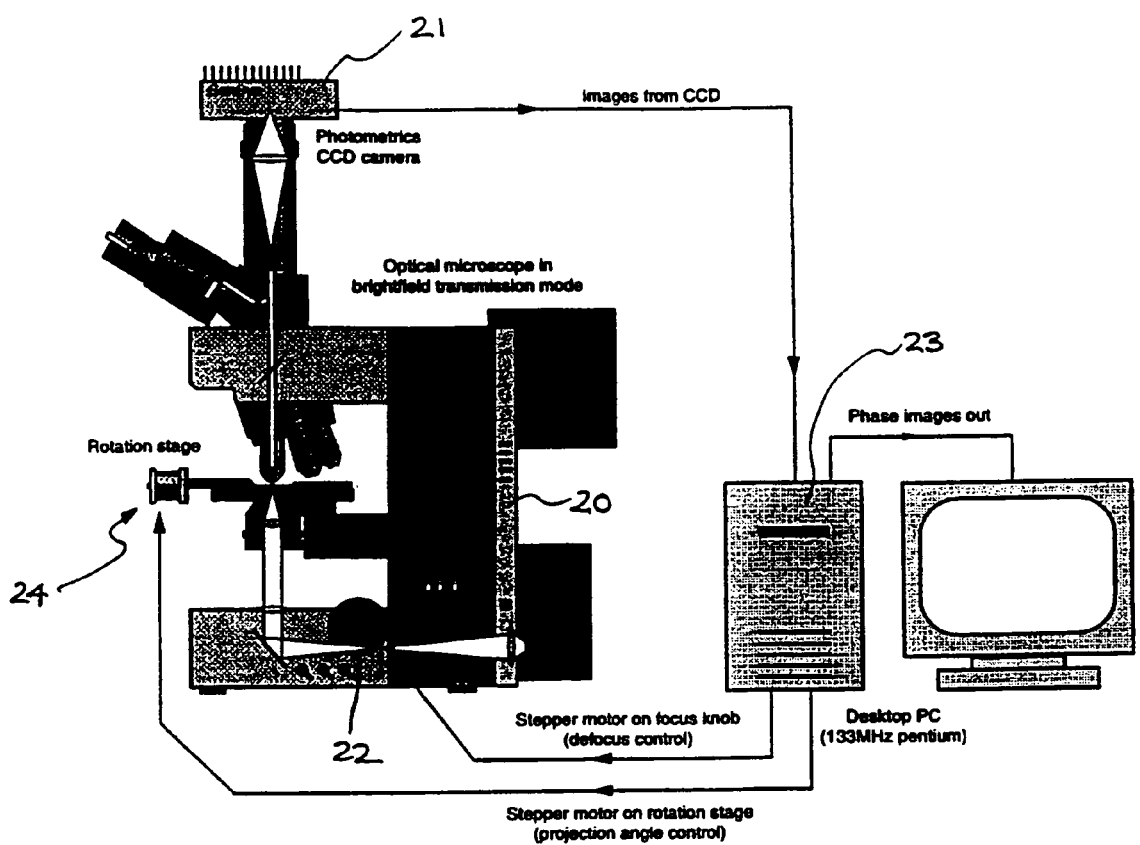

FIG. 10 is a schematic drawing of an exemplary system for three dimensional optical phase tomography according to this invention.

Figure 11:
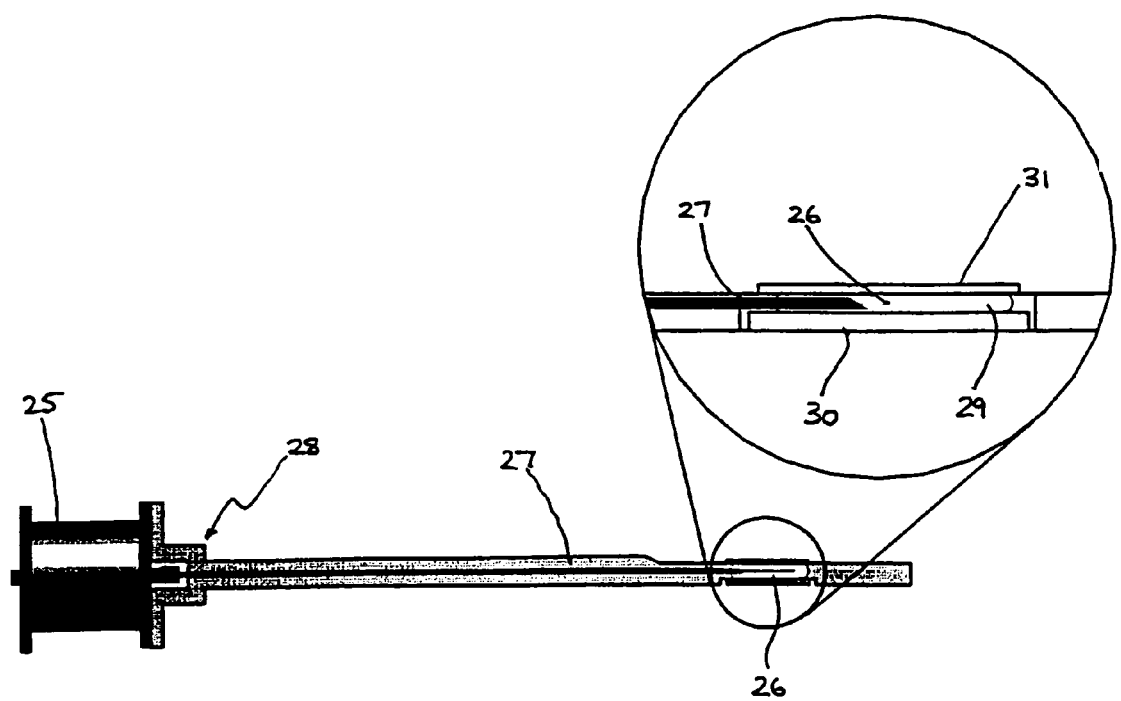
Figure 12:
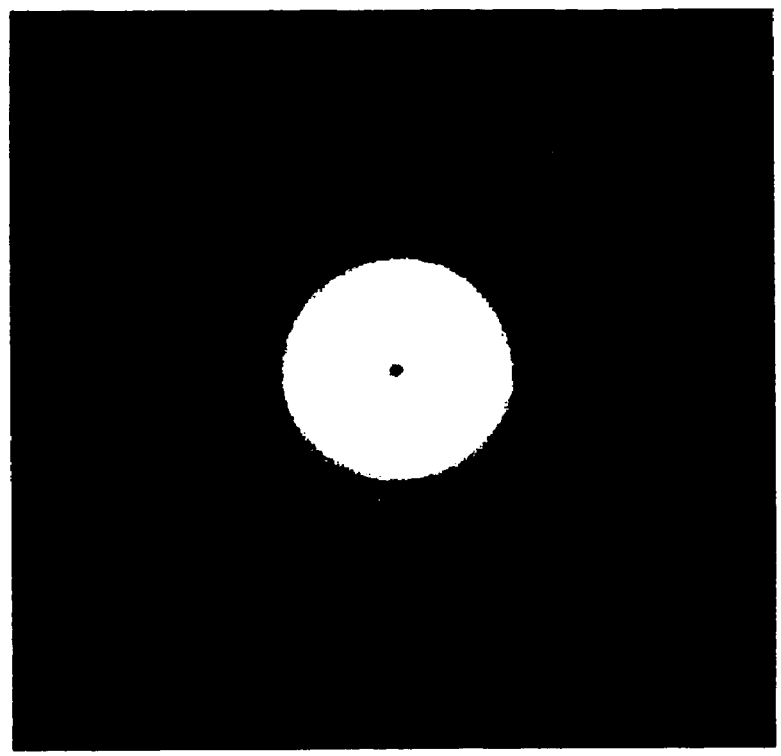
Figure 13:
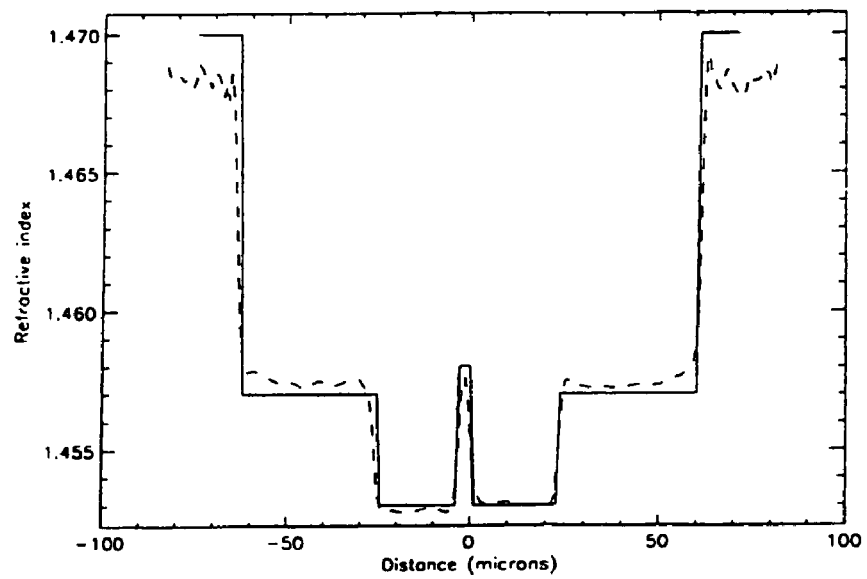

FIG. 11 is a schematic enlargement of part of FIG. 10;

FIG. 12 is a typical tomographic slice through phase image produced in Example 4; and FIG. 13 shows a comparison of reconstructed refractive index distribution with known refracture index distribution according to Example 4.

Figure 1A:
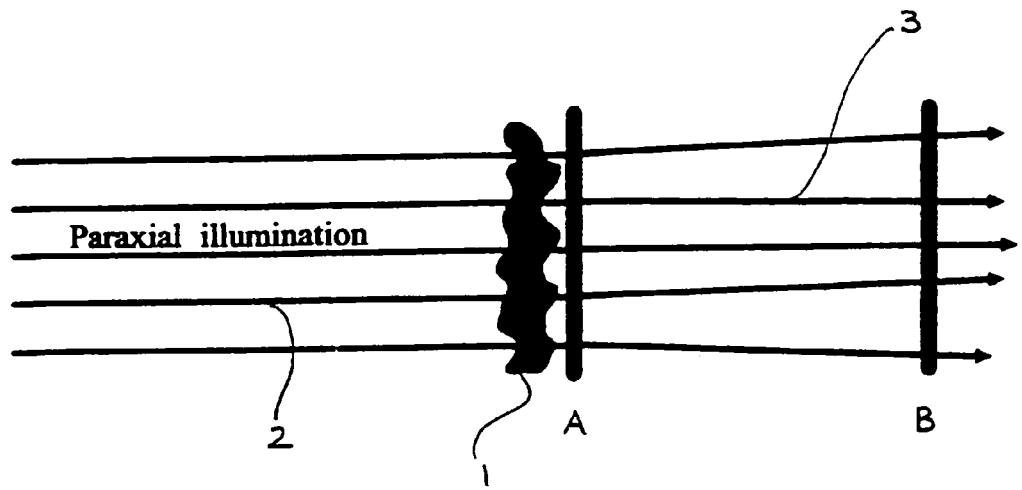
FIG. 1 is a schematic illustration of an arrangement for determination of phase where an object is illuminated with (a) plane wave radiation and (b) point-source radiation.

FIGS. 1(a) and (b) show a schematic arrangement for phase determination in accordance with this invention where an object is illuminated by plane-wave radiation 2 or point source radiation 2 to produce reflected beams 3.

At each point in space, an optical beam possesses two properties: intensity and phase. Intensity is a measure of the amount of energy flowing through each point, while phase gives a measure of the direction of the energy flow.

Intensity may be measured directly, for example by recording an image on film. Phase is typically measured using interference with a "reference beam". In contrast the present method gives a non-interferometric method for measuring phase.

Intensity can be measured over two parallel planes A, B extending across the direction of propagation of the wave field on the side remote from the incident radiation.

Figure 1B:
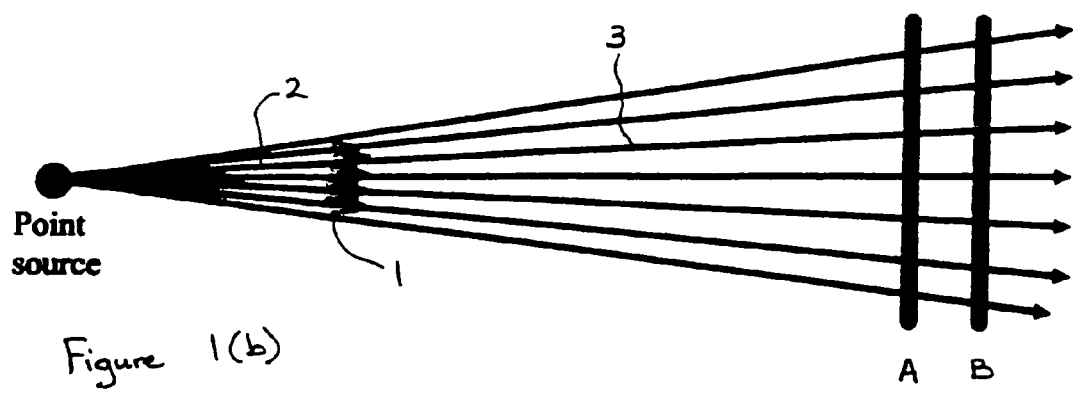

The present invention determines phase by providing a solution to the transport-of-intensity equation:

$$\nabla_\perp \bullet (I \nabla_\perp \phi) = -k \frac{\partial I}{\partial z} \quad (1)$$

where I is the intensity in the plane, the gradient operator in the plane is denoted $\nabla_\perp$, k is the wave number of the radiation, and $\partial I/\partial z$ is the intensity derivative or rate of change of intensity. Note that $\partial I/\partial z$ is estimated from the difference of the measurements in the planes A & B shown in FIG. 1, while the intensity I is given by the average of the measurements.

In order to obtain a solution to equation 1 the function A is first defined as:

$$\nabla_\perp A = I \nabla_\perp \phi. \quad (2)$$

Thus equation (1) becomes:

$$\nabla_\perp \cdot (\nabla_\perp A) = -k \partial_z I. \quad (3)$$

Making use of a standard identity $\nabla_\perp \cdot \nabla_\perp = \nabla_\perp^2$, this may be written:

$$\nabla_\perp^2 A = -k \partial_z I \quad (4)$$

where $\nabla_\perp^2$ denotes the two-dimensional Laplacian acting over the surface of the image. This equation has the following symbolic solution:

$$A = -k \nabla_\perp^{-2} \partial_z I. \quad (5)$$

If the gradient operator $\nabla_\perp$ is applied to both sides of this equation, it becomes:

$$\nabla_\perp A = -k \nabla_\perp \nabla_\perp^{-2} \partial_z I. \quad (6)$$

The defining equation (2) for the function A allows (6) to be transformed into:

$$I \nabla_\perp \phi = -k \nabla_\perp \nabla_\perp^{-2} \partial_z I. \quad (7)$$

Dividing both sides by I then yields:

$$\nabla_\perp \phi = -k I^{-1} \nabla_\perp \nabla_\perp^{-2} \partial_z I. \quad (8)$$

Taking the two dimensional divergence $\nabla_\perp \cdot$ of both sides of (8), and again making use of the standard identity $\nabla_\perp \cdot \nabla_\perp = \nabla_\perp^2$, then (8) becomes:

$$\nabla_\perp^2 \phi = -k \nabla_\perp \cdot [I^{-1} \nabla_\perp \nabla_\perp^{-2} \partial_z I]. \quad (9)$$

This equation has the following symbolic solution:

$$\phi = -k \nabla_\perp^{-2} (\nabla_\perp \cdot [I^{-1} \nabla_\perp \nabla_\perp^{-2} \partial_z I]). \quad (10)$$

In order to implement a practical solution to equation (10), the following formulae are required. A suitably-well-behaved function f(x,y) may be written in the form of a two-dimensional Fourier integral:

$$f(x, y) = \int_{-\infty}^{\infty} \int_{-\infty}^{\infty} \hat{f}(k_x, k_y) e^{i(k_x x + k_y y)} dk_x dk_y. \quad (11)$$

The function $\hat{f}(k_x, k_y)$ is called the "Fourier transform" of f(x,y).

The x derivative of (11) yields:

$$\frac{\partial}{\partial x} f(x, y) = \int_{-\infty}^{\infty} \int_{-\infty}^{\infty} [i k_x \hat{f}(k_x, k_y)] e^{i(k_x x + k_y y)} dk_x dk_y. \quad (12)$$

Hence the Fourier transform of $$\frac{\partial}{\partial x} f(x, y)$$

is equal to the Fourier transform of f(x,y) multiplied by $ik_x$. Stated differently, $$\frac{\partial}{\partial x} = i F^{-1} k_x F,$$

where F denotes Fourier transformation and $F^{-1}$ denotes inverse Fourier transformation. Similar considerations apply to $$\frac{\partial}{\partial y} f(x, y).$$

If the Laplacian $$\nabla_\perp^2 = \frac{\partial^2}{\partial x^2} + \frac{\partial^2}{\partial y^2}$$

of (11) is obtained and similar reasoning applied, it follows that $\nabla_\perp^{-2} = -F^{-1} k_r^{-2} F$, where $k_r^2 = k_x^2 + k_y^2$. Thus:

$$\nabla_\perp^{-2} = -F^{-1} k_r^{-2} F, \frac{\partial}{\partial x} = i F^{-1} k_x F, \frac{\partial}{\partial y} = i F^{-1} k_y F. \quad (13)$$

Here, F denotes Fourier transformation, $F^{-1}$ denotes inverse Fourier transformation, $(k_x, k_y)$ are the Fourier variables conjugate to (x,y), and $$k_r^2 = k_x^2 + k_y^2.$$

Equations (13) can be used to rewrite equation (10) in the form $$\phi = \phi^{(x)} + \phi^{(y)}, \begin{cases} \phi^{(x)} = F^{-1}k_r^{-2}k_x F T^{-1} F^{-1} k_x k_r^{-2} F\left[k\frac{\partial I}{\partial z}\right] \\ \phi^{(x)} = F^{-1}k_r^{-2}k_y F T^{-1} F^{-1} k_y k_r^{-2} F\left[k\frac{\partial I}{\partial z}\right] \end{cases} \quad (14)$$

In practice division by intensity is only performed if that intensity is greater than a certain threshold value (eg. 0.1% of the maximum value).

Division by $k_r$ does not take place at the point $k_r=0$ of Fourier space; instead multiplication by zero takes place at this point. This amounts to taking the Cauchy principal value of the integral operator $\nabla_\perp^{-2}$.

In order to quantitatively measure the phase of object it is necessary to incorporate some physical constants into the phase recovery algorithm given in Equation (14) relating to the experimental setup in use to quantify the variables $k_x$, $k_y$. This can be done by rewriting equation (14) in the following form suitable for implementation using a fast Fourier transform:

$$\phi = \phi_x + \phi_y,$$
$$\begin{cases} \phi_x = -\frac{2\pi}{\lambda\delta z}\frac{1}{(N\Delta x)^2}F^{-1}\frac{i}{i^2+j^2}F\frac{1}{I(x,y)}F^{-1}\frac{i}{i^2+j^2}F\{I_+ - I_-\} \\ \phi_y = -\frac{2\pi}{\lambda\delta z}\frac{1}{(N\Delta x)^2}F^{-1}\frac{j}{i^2+j^2}F\frac{1}{I(x,y)}F^{-1}\frac{j}{i^2+j^2}F\{I_+ - I_-\} \end{cases}$$

where $$i, j \in \left[\frac{-N}{2}, \frac{N}{2}\right]$$

index the frequent components of $F(I_+-I_-)$ where the intensity derivative $\partial_z I(x,y)$ is obtained by subtracting two images $I_+$ and $I_-$ separated by a distance $\delta z$, i and j are the pixel numbers on the image, and using the fact that the Fourier space step size is given by $$\Delta k = \frac{1}{N\Delta x}$$

where the image is an N×N array of pixels of size $\Delta x$. Thus in addition to measuring the three intensity distributions it is necessary to know the pixel size $\Delta x$, defocus distance $\delta z$ and wavelength $\lambda$ in order to make a quantitative phase measurement. All of these quantities can be readily determined: the pixel size can be determined directly for example from the CCD detector geometry (in the case of direct imaging), or by existing techniques for calibrating the transverse distance scales (in the case of an imaging system), the defocus distance can be measured directly, and the spectral distribution of the illumination can be determined either by monochromating the incident field or by analysing the spectral distribution of the radiation using existing spectroscopic methods.

Figure 2:
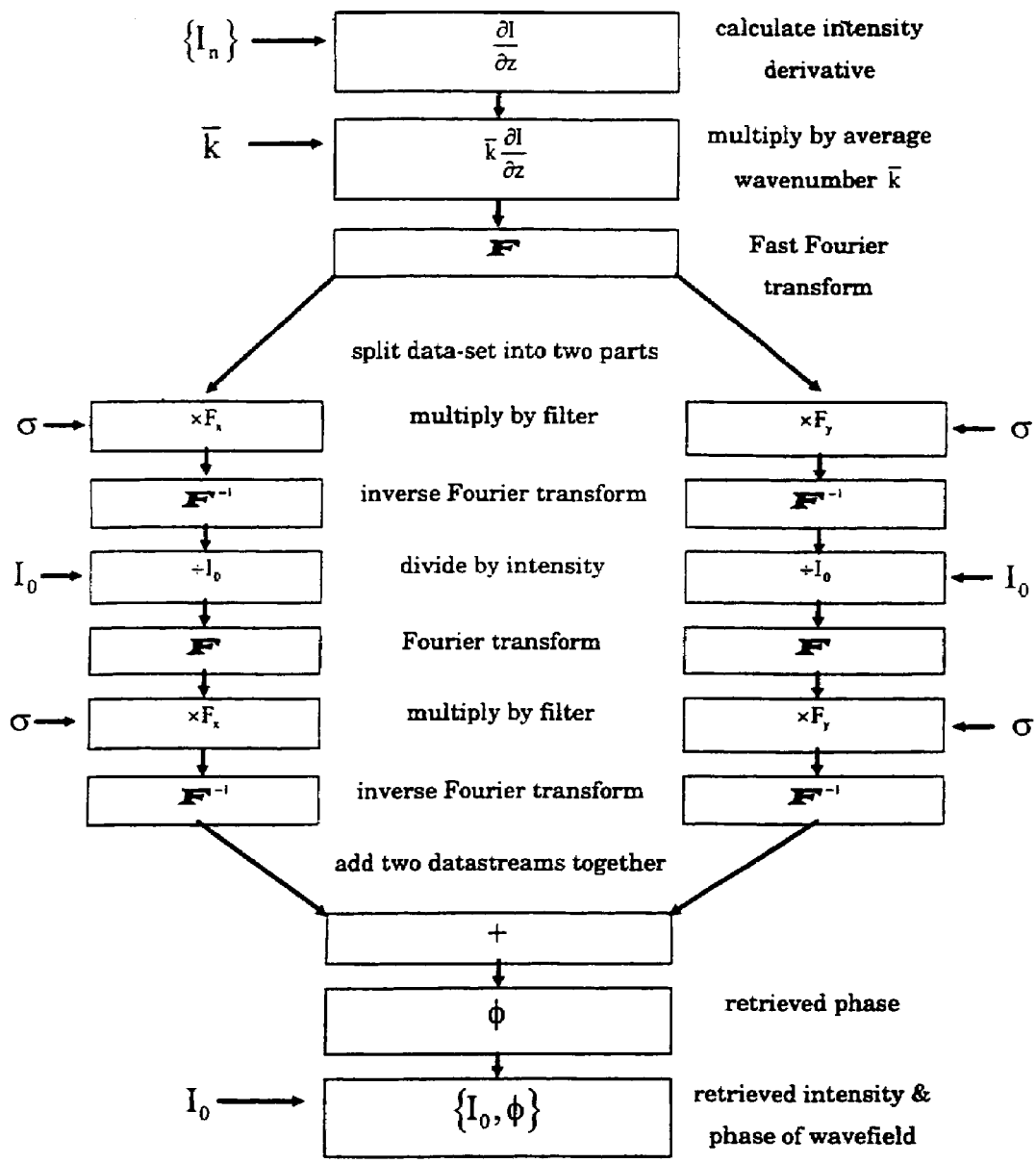
FIG. 2 is a flow chart showing an implementation of the method of phase determination in accordance with an embodiment of this invention.

An example of the phase-retrieval method implementing the solution of equation (14) can be represented by the flowchart shown in FIG. 2. As shown in FIG. 2 the quantitative determination of phase of a radiation wave field proceeds from a set of intensity measurements $\{I_n\}$ over the two spaced apart planes A and B. A measurement of central intensity I(x,y) in a selected plane parallel to and midway between the planes A and B is also obtained. The intensity measurements are performed over a defined array on each of the two planes A and B and the respective values subtracted to produce a measure of the intensity derivative. This value is multiplied by the negative of the average wave number. The data are split into two component sets and a fast Fourier transform is performed to produce the respective x and y components in the Fourier domain. A filter is then applied to the Fourier domain representations to correspond to the inversion of a differential operator reflected in the untransformed representation. The differential operator is represented by $\partial_x^{-1}\nabla_\perp^2$ for the x component and $\partial_y^{-1}\nabla_\perp^2$ for the y component. An inverse Fourier transform is then performed on each of the x and y components to produce a spatial domain value from which the differential operator has been removed. A division by the central intensity I(x,y) obtained by averaging the intensity measurements over planes A and B is then performed if the intensity level is above a selected threshold level. The resultant data is again Fourier transformed and multiplied by the same filter to again correspond to the inversion of a differential operator reflected in the untransformed data. The differential operator is again represented by $\partial_x^{-1}\nabla_\perp^2$ for the x component and $\partial_y^{-1}\nabla_{y,\perp}^2$ for the y component. The resultant components are again inverse Fourier transformed and summed to provide a retrieved phase measurement.

It will be apparent that in general the method according to this invention can proceed from any suitable representative determination of intensity derivative or rate of change of intensity over a selected surface extending across the propagation direction and the intensity over that same surface. As will be explained in various examples these data can be obtained in a variety of ways and the method implemented to yield phase of the radiation wave field.

Rewriting equation (14) with:

$$\Omega_x(k_x, k_y, \alpha) = k_x k_r^{-2} \quad (15)$$
$$\Omega_y(k_x, k_y, \alpha) = k_y k_r^{-2}$$
$$\phi(x, y) = \phi^{(x)}(x, y) + \phi^{(y)}(x, y), \text{ gives}$$

$$\begin{cases} \phi^{(x)}(x,y) = F^{-1}\Omega_x(k_x, k_y, \alpha)F\frac{1}{I(x,y)}F^{-1}\Omega_x(k_x, k_y, \alpha)F\left[k\frac{\partial I}{\partial z}\right] \\ \phi^{(y)}(x,y) = F^{-1}\Omega_y(k_x, k_y, \alpha)F\frac{1}{I(x,y)}F^{-1}\Omega_y(k_x, k_y, \alpha)F\left[k\frac{\partial I}{\partial z}\right] \end{cases}$$

where:
  $\phi(x,y)$ denotes the recovered phase,
  F denotes Fourier transformation, and $F^{-1}$ denotes inverse Fourier transformation,
  I(x,y) is the intensity distribution over the plane of interest,
  (x,y) are Cartesian coordinates over the plane of interest,
  $(k_x,k_y)$ are the Fourier variables conjugate to (x,y)
  $\bar{k}=2\pi/\bar{\lambda}$ is the average wavenumber of the radiation,
  $\bar{\lambda}$ is the average wavelength of the radiation,
  $\partial I/\partial z$ is the estimate for the longitudinal intensity derivative,
  $\alpha$ is the regularization parameter used to stabilize the algorithm when noise is present.

As given above, the solution to the transport of intensity equation (1) assumes a perfect imaging system. That is, there are no "aberrations" present in the optical system used to obtain the intensity data which is fed into the algorithm. Of course, no imaging system is perfect. The imperfections present in an imaging system may be quantified by a set of numbers:

$$A_1, A_2, A_3, \ldots \tag{16}$$

which are termed aberration coefficients.

If intensity data were taken on an imperfect instrument whose imperfections were characterized by a certain set of known aberration coefficients $A_1, A_2, A_3, \ldots$, it would be desirable if the filters $\Omega_x(k_x,k_y,\alpha)$ and $\Omega_y(k_x,k_y,\alpha)$ present in (15) could be replaced by modified filters which explicitly depend upon the aberration coefficients:

$$\tilde{\Omega}_x(k_x,k_y, \alpha, A_1, A_2, A_3, \ldots) \text{ and } \tilde{\Omega}_y(k_x,k_y, \alpha, A_1, A_2, A_3, \ldots) \tag{17}$$

This would allow the imperfections of the imaging system to be explicitly taken into account, leading to quantitatively correct phase retrieval using aberrated imaging systems. For the special case of a non-absorbing phase object in a radiation wave field of uniform intensity with weak (i.e. much less than $2\pi$ radians) phase variations the appropriate modified filters lead to the following functional form for the phase-retrieval algorithm:

$$\phi(x, y) = F^{-1}\left\{ \frac{F\{I_{aberrated}(x, y) - 1\}}{\left(-2\pi \cdot \delta z \cdot \bar{\lambda}(k_x^2 + k_y^2) - 2\sum_m \sum_n A_{mn} k_x^m k_y^n \right)} \right\}, \tag{18}$$

where:

$I_{aberrated}(x,y)$ is the aberrated intensity measured at defocus distance $\delta z$, $A_{mn}$ are the aberration coefficients which characterize the imperfect imaging system.

If a filter is defined:

$$\tilde{\Omega}(k_x k_y, \alpha, A_1, A_2, A_3, \ldots) = \frac{1}{\sqrt{-2\pi \cdot \delta z \cdot \bar{\lambda}(k_x^2 + k_y^2) - 2\sum_m \sum_n A_{mn} k_x^m k_y^n}} \tag{19}$$

Then (18) becomes:

$$\phi(x, y) = F^{-1} \tilde{\Omega} F \frac{1}{I_0} F^{-1} \tilde{\Omega} F \{I_{aberrated}(x, y) - 1\} \tag{20}$$

The term $\{I_{aberrated}(x,y)-1\}$ is a measure of rate of change of intensity. $I_0$ intensity is a measurable constant for uniform intensity so that (20) is the same general form as (15). Consequently the special case of aberration can be dealt with by changing the filter in the general method described above.

The x and y component filters $\Omega_x$ and $\Omega_y$ are given by $$\Omega_x = \Omega_y = \frac{1}{\sqrt{2}} \tilde{\Omega} \tag{21}$$

EXAMPLE 1

Simulations with Normally Incident Plane Wave Irradiation

A simulation was conducted in accordance with the arrangement shown in FIG. 1(a) corresponding to planar illumination. The example shows the operation of the method on simulated noise-free data. Diffraction patterns are calculated using the "angular-spectrum" formalism, an orthodox procedure. FIGS. 3(a) to 3(f) show images produced in the simulation.

Figure 3:
Figure 3:
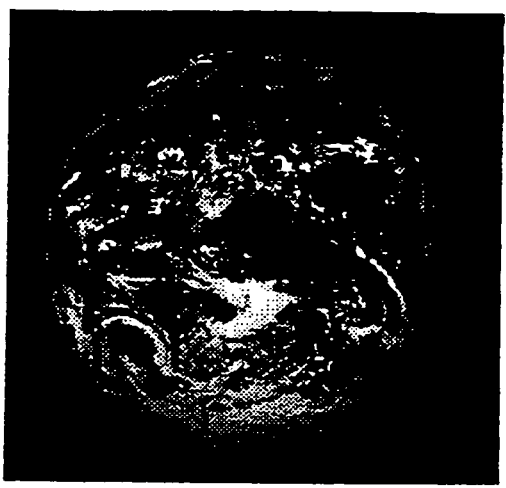
Figure 3:
Figure 3:
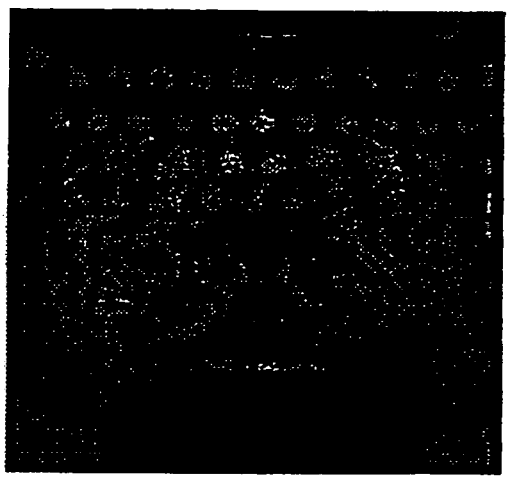
Figure 3:
Figure 3:
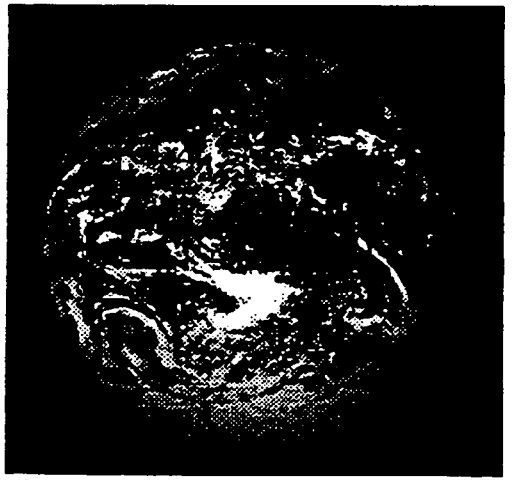

Dimensions of all images are 1.00 cm square and provide a sampling array of 256×256 pixels in a plane extending perpendicularly across the propagation direction of the radiation. The wavelength of the light was taken to be 632.8 nm. The intensity in the plane z=0, which varies from 0 to 1 in arbitrary units, is shown in FIG. 3(a). Within the area of nonzero illumination, the minimum intensity was 30% of the maximum intensity. (The black border around the edge of the intensity image corresponds to zero intensity.) The input phase, which varies from 0 to $\pi$ radians, is shown in FIG. 3(b).

Images corresponding to planes negatively and positively displaced 2 mm from the z=0 plane shown are in FIGS. 3(c) and (d) respectively, and have respective maximum intensities of 1.60 and 1.75 arbitrary units; the propagation-induced phase contrast is clearly visible in each of these images. The two defocused images are subtracted to form the intensity derivative, which is shown in FIG. 3(e).

Figure 4:
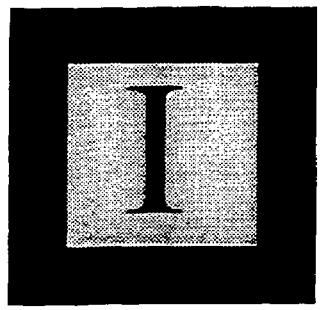
Figure 4:
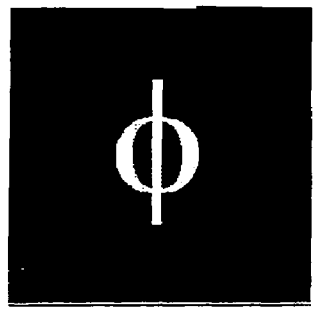
Figure 4:
Figure 4:
Figure 4:
Figure 4:
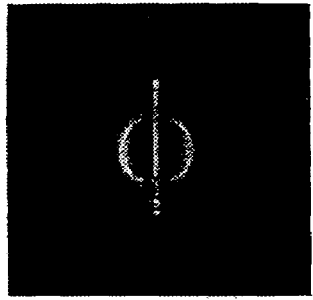
Figure 4:
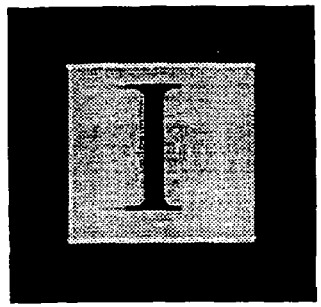
Figure 4:
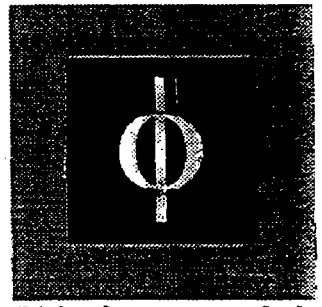

Images shown in FIGS. 3(a) and (e) respectively providing measures of intensity and rate of change of intensity across the z=0 plane were then processed according to a computer implementation of the method shown in FIG. 2, in order to yield the recovered phase map given in FIG. 3(f). Note that FIGS. 3(b) and (f) are plotted on the same greyscale levels, indicating that the recovered phase is quantitatively correct FIGS. 4(a) to (h) shows a series of simulated images illustrating phase determination and subsequent back-propagation to another image plane. All images are 256 pixels× 256 pixels=1 cm×1 cm in dimensions, with the radiation wavelength equal to 632.8 nm. The intensity and phase of the radiation in a given plane are shown in FIGS. 4(a) and (b) respectively. FIGS. 4(c) through (e) respectively show the propagated intensity at propagation distances of 199,200 and 201 mm; note the intermixing of information from FIGS. 4(a) and (b) in the intensity measurements of FIGS. 4(c), (d) and (e). Using the images of FIGS. 4(c), (d) and (e) only, the phase-retrieval algorithm obtained the phase map given in FIG. 4(f) for the phase of the propagated field at distance 200 mm. Images of Figures (d) and (f) were used to numerically back-propagate the field back to the initial plane. This gave FIGS. 4(g) and (h) for the back-propagated intensity and phase, respectively. These are in excellent agreement with FIGS. 4(a) and (b), thus demonstrating the use of the phase retrieval techniques for the quantitative determination of the amplitude and phase of a field over regions far displaced from those over which intensity measurements are made. Note also that the back-propagation is not restricted to free space; back-propagation can also be effected through a known optical system.

EXAMPLE 2

Point Projection Microscopy

As shown in FIG. 5, radiation such as X-rays, visible light or electrons from a point source 10 is allowed to propagate through free space to the object 11, located at a distance $d_{so}$ from the source. The radiation passes through the object 11, and is allowed to propagate a further distance $d_{od}$ to one of the image planes $I_1, I_2 \ldots I_n$ in which the intensity of the radiation is detected. This detection is performed using a standard device such as a CCD camera, image plate or other device capable of registering and digitising the intensity distribution. One or both of the distances $d_{so}$ and/or $d_{sd}$ is then changed so as to introduce defocus into the images and the intensity distribution is measured once again. The case of $d_{od}=0$ corresponding to contact-imaging with zero propagation distance is included as one possible measurement.

The intensity data is then processed using the above phase recovery method, to recover the decoupled intensity and phase information in the imaging plane. Parameters, such as wavelength, pixel size, and defocus distances are inserted into the algorithm as explained above, to yield quantitative information about the magnitude of the phase shift in the image plane.

In certain cases a reconstruction of the object in the object plane, as opposed to the downstream diffraction planes $I_1 \ldots I_n$, is desired. In this case the intensity and quantitative phase information obtained above can be used to back propagate the light field to the object plane, thereby numerically reconstructing an image of the actual object phase and intensity structure. This can be done using standard diffraction code.

In some cases it is desirable to take more than two images in order to obtain a better estimate of the intensity derivative dI/dz, in which case one or both of the distances $d_{so}$ and/or $d_{sd}$ is altered once again and another image taken, with this procedure repeated until the number of desired images is acquired. A function can then be fitted to this data from which dI/dz can be computed and used in the phase recovery algorithm in place of the simple subtraction of two images normally used.

EXAMPLE 3

Quantitative Phase Amplitude Microscopy

FIG. 6 schematically shows an arrangement for quantitative phase amplitude microscopy. A sample is illuminated using a source of white light Köhler illumination 15, commonly found on optical microscopes. The light is transmitted through an object 16 and collected by a microscope imaging system 17 and relayed to a CCD camera 18 or other digital imaging device having a planar imaging surface. Three images are collected: an in-focus image, $I_0$, and two slightly out of focus images $I_+$ and $I_-$. The defocus is obtained by suitable means such as a drive system 19 to adjust the microscope focus knob. The defocus introduced is usually quite small so that degradation in spatial resolution, while minimised, although the optimal amount of defocus to use is determined by sample properties and imaging geometry such as magnification, numerical apertures, etc.

When taking the images the numerical aperture of the condenser is chosen to be less than the numerical aperture of the objective being used. If this is not the case then serious image degradation will occur, although the precise amount by which the condenser and objective numerical apertures should differ involves a tradeoff between image fidelity and spatial resolution, with the optimal difference depending on the sample properties and the optics used.

Intensity data from the collected images $I_+$ and $I_-$ are subtracted to produce a representative measure of rate of change of intensity (intensity derivative). From this and the intensity data of collected image $I_0$ the method described above can be used to produce quantitative information about the magnitude of the phase shift in the image plane.

As in Example 2 for point projection, there may be cases in which it is desirable to take more than two images in order to obtain a better estimate of the intensity derivative dI/dz. A function can then be fitted to this data from which dI/dz can be computed and used in the phase determination method in place of the simple subtraction of two images normally used.

It is also possible to operate this system in a reflection geometry to obtain surface topography. The principle of operation is the same, however the optics have to be folded back on themselves to form a reflection geometry—otherwise the process is identical.

For certain applications it can also be desirable to filter the light to a particular wavelength, although this is not necessary for the described imaging process as it works equally well with white light.

An experimental implementation is shown in FIG. 7. An Olympus BX-60 optical microscope 20 was equipped with a set of UMPlan metallurgical objectives and a universal condenser to provide Köhler illumination. In order to be able to compare the results with existing imaging modes Nomarski DIC optics and a set of cover-slip corrected UplanApo objectives were also acquired for this microscope, enabling images to be taken of the same field of view using both phase retrieval and Nomarski DIC for the purposes of qualitative comparison. A 12-bit scientific grade Photometrics SenSys CCD camera 21 equipped with a 1300×1035 pixel Kodak KAF-1400 CCD chip was added to the 0.5x video port on the microscope to acquire digital images of the sample.

The phase recovery technique of this embodiment of the invention requires the acquisition of defocused images. A stepper motor drive system 22 was attached to the focus knob of the microscope. This stepper motor 22 was attached to the parallel port of a 133 MHz Pentium PC 23 also used to control the CCD camera 21, enabling full automation of the acquisition of through-focus image sequences. This data acquisition system was linked to custom software written to recover phase images from the CCD images, thereby enabling full automation of the image acquisition and data processing sequences.

In order to demonstrate that phase imaging using this invention can accurately measure the phase structure of microscopic samples it was necessary to have a sample with a well-characterised geometry and refractive index distribution. A 3M F-SN-3224 optical fibre (a commercial fibre made by 3M) was used. Independent measurements of the refractive index distribution obtained using atomic force microscopy and commercial profiling techniques were available enabling accurate prediction of the phase structure of the exit wave field. Another advantage of this fibre was that it had three regions of different refractive indices, an inner and outer cladding as well as the core, whereas most fibres simply have a cladding and core. This provided an additional test for the phase imaging system because it had to accurately image three transitions in refractive index rather than just two.

The optical fibre was imaged side-on so as to obtain a projection of the refractive index through all layers of the fibre structure. This was done by first stripping the plastic sheath from the fibre by soaking it in isopropyl alcohol then using a commercial fibre stripper to remove the plastic coating. A small segment of fibre, typically a strand of approximately one to two centimetres in length, was placed on a microscope slide, immersed in a pool of index matching fluid and covered with a 0.15 mm thick cover glass. Any tilt on the cover glass would introduce a spurious tilt into the recovered phase so two small sections of fibre, both of similar diameter to the sample, were placed parallel to and about 0.5 cm either side of the main fibre. The cover class was then placed across all three fibres to ensure that it was as parallel to the microscope slide as practically possible.

Figure 8:
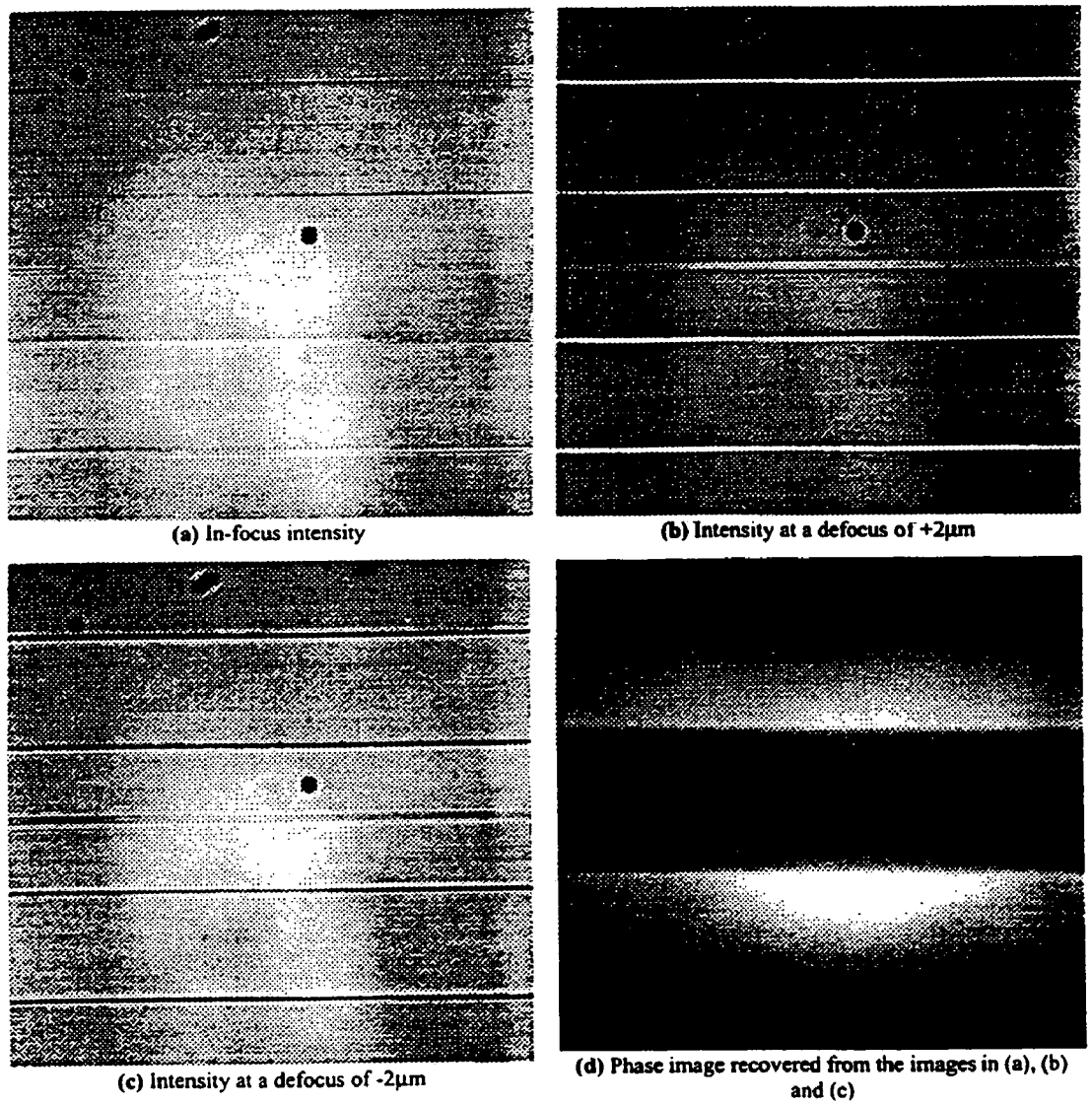

Images of the fibre were taken using an Olympus 40x 0.7NA UplanApo objective, which meant that a 500×500 pixel image conveniently spanned the whole width of the fibre, and the condenser was set at NA=0.2. The fibre's refractive index profiles were known for 632.8 nm (HeNe laser) light, so a 625±10 nm band-pass interference filter was inserted into the illumination system to ensure that the recovered phase profiles were obtained at a wavelength as close as possible to that for which data was available on the fibre. An intensity image of this sample in the plane of best focus and at ±2 µm either side of best focus is shown in FIG. 8, alongside a phase image recovered from the two defocused images using the phase-retrieval algorithm described above. Note that the fibre is virtually invisible in the in-focus image and barely visible in slightly defocused images, whilst both the fibre and the regions of different refractive index, including the 4 µm diameter core, are clearly visible in the phase image.

FIG. 9 shows a comparison of the measured and expected phase profiles with the uncertainties indicated in the figure representing one standard deviation of the data along the length of the fibre. This variation is thought to be primarily due to spatial variations in thickness of the cover glass and microscope slide. As can be seen, the recovered and expected phase profiles are in good agreement with one another, with the predicted profile lying within the error bars of the profile produced using the technique of this invention.

EXAMPLE 4

Three-dimensional Optical Phase Tomography

This example demonstrates the application of quantitative phase microscopy to the three-dimensional imaging of objects through the use of computed-tomography techniques. This is possible using the techniques of this invention because the phase shifts introduced by the object can be directly measured independently of any intensity variations in the object, thus an inverse Radon transform can be used to recover the three-dimensional structure directly from the projection data. Although the experimental demonstration provided is in the optical regime, the same principles are equally applicable to X-ray, electron and neutron phase tomography.

For the purposes of collecting three dimensional data sets the same optical microscope described in the previous example is used with the addition of a rotation stage 24 for the purposes of rotating the sample within the confines of the optical microscope imaging area as shown in FIG. 10. The rotation stage 24 is shown in greater detail in FIG. 11.

The previously described arrangements included a stepper motor drive system 22 attached to the parallel port of the same 133 MHz Pentium PC used to control the CCD camera 21 to drive the focus knob of the microscope. A second stepper motor 25 was connected to the second channel of the motor drive system 24 for the purposes of rotating the sample. This data acquisition system was linked to custom software written to recover phase images from the CCD images, thereby enabling full automation of the image acquisition and data processing sequence. Each data set was collected using the same microscope as in Example 3—an Olympus BX-60 optical microscope equipped with a set of cover-slip corrected UplanApo objectives and a universal condenser to provide Köhler illumination. Digital images were captured using a 12-bit Photometrics SenSys CCD camera equipped with a Kodak KAF-1400 1300×1035 pixel CCD chip on the 0.5x video port of the microscope.

To prepare the fibre sample 26 for imaging the plastic sheath was removed from a small segment of the end of a section of fibre, typically about one centimetre in length, by soaking the fibre in isopropyl alcohol then using a commercial fibre stripper to remove the plastic coating. The fibre was then cut into a small segment of approximately one inch in length, with the unstripped end then being slid into the end of a 26 gauge, 100 mm syringe needle 27 and fixed into position with a small amount of 5 minute Araldite. A mount 28 was used to attach the needle 27 to stepper motor 25. A pool of index-matching fluid 29 surrounds the fibre 26 as shown in FIG. 11, with a microscope slide 30 affixed underneath the fibre using silicone grease and a 0.15 mm thick cover glass 31 placed over the top.

Transmission intensity images were collected in the same way as described in Example 3 above using an Olympus 20x 0.45NA UMPlan objective with the condenser set at NA=0.1. The images taken were 500×500 pixels in size which conveniently spanned not only the width of the fibre but also the whole region of precession. As the refractive index profile of this fibre was known for 632.8 nm (HeNe laser) light, a 625±10 nm band-pass interference filter was inserted into the illumination system to ensure that the recovered phase profiles were obtained at a wavelength as close as possible to that for which data on the fibre was available. Each phase image was processed from images taken at ±2 µm either side of best focus, and data was collected from 100 independent angles through 180 degrees equally spaced in steps of 1.8 degrees between images. A typical tomographic phase image is shown in FIG. 12.

The projection data, in the form the reconstructed phase images, were then processed into three-dimensional data sets using a simple slice-by-slice implementation of the summation of filtered back-projections algorithm, with code to perform the tomographic reconstruction written in the IDL/PV-Wave programming language. First, the data sets were aligned to a common rotation axis by taking profiles through the phase data sets and compiling them into a sinogram. A sinusoid was then fitted to prominent features on the data in order to determine the location of the rotation axis and the data was digitally shifted so that the rotation axis coincided with the middle column of the sinogram to simplify the reconstruction process. Fitting a curve to the phase profiles also enabled misaligned data sets to be moved back into line, which in turn improved the quality of the reconstructed image. This realigned projection data was then transformed into a single slice through the object by back-projecting the collated phase data after filtering the projections to suppress the 1/r point spread function associated with back-projected reconstructions. These slices through the object were then stacked up on top of each other to produce a full three-dimensional refractive index distribution of the sample.

A slice through the reconstructed refractive index distribution is shown in FIG. 13. Note that all three regions of different refractive index are clearly resolved and that these regions form concentric cylinders, as is expected for this sample. A line profile through the centre of this reconstruction is shown in FIG. 13 (dashed line) alongside the known refractive index distribution for this fibre (solid line). The values in the tomographic reconstruction are very close to those of the known profile, which confirms the quantitative phase tomography technique.

The invention claimed is:

1. A computer program to execute the steps of
   (a) producing a representative measure of the rate of change of intensity of said radiation wave field over a selected surface extending generally across the wave field;
   (b) producing a representative measure of intensity of said radiation wave filed over said selected surface;
   (c) transforming said measure of rate of change of intensity to produce a first integral transform representation and applying to said first integral transform representation a first filter corresponding to the inversion of a first differential operator reflected in said measure of rate of change of intensity to produce a first modified integral transform representation;
   (d) applying an inverse of said first integral transform to said first modified integral transform representation to produce an untransformed representation;
   (e) applying a correction based on said measure of intensity over said selected surface to said untransformed representation;
   (f) transforming the corrected untransformed representation to produce a second integral transform representation and applying to said second integral transform representation a second filter corresponding to the inversion of a second differential operator reflected in the corrected untransformed representation to produce a second modified integral transform representation;
   (g) applying an inverse of said second integral transform to said second modified integral transform representation to produce a measure of phase of said radiation wave field across said selected plane.

2. A computer program stored on computer readable storage media including means to execute the steps of claim 1.

3. A computer program for processing a representative measure of the rate of change of intensity of a radiation wave field over a selected surface extending generally across the wave field and a representative measure of intensity of the radiation wave field over the selected surface, the program including:
   (a) code for transforming said measure of rate of change of intensity to produce a first integral transform representation and applying to said first integral transform representation a first filter corresponding to the inversion of a first differential operator reflected in said measure of rate of change of intensity to produce a first modified integral transform representation;
   (b) code for applying an inverse of said first integral transform to said first modified integral transform representation to produce an untransformed representation;
   (c) code for applying a correction based on said measure of intensity over said selected surface to said untransformed representation;
   (d) code for transforming the corrected untransformed representation to produce a second integral transform representation and applying to said second integral transform representation a second filter corresponding to the inversion of a second differential operator reflected in the corrected untransformed representation to produce a second modified integral transform representation;
   (e) code for applying an inverse of said second integral transform to said second modified integral transform representation.

4. A computer program stored on computer readable storage media for processing a representative measure of the rate of change of intensity of a radiation wave field over a selected surface extending generally across the wave field and a representative measure of intensity of said radiation wave field over said selected surface, said program including:
   (a) code for transforming said measure of rate of change of intensity to produce a first integral transform representation and applying to said first integral transform representation a first filter corresponding to the inversion of a first differential operator reflected in said measure of rate of change of intensity to produce a first modified integral transform representation;
   (b) code for applying an inverse of said first integral transform to said first modified integral transform representation to produce an untransformed representation;
   (c) code for applying a corrected based on said measure f intensity over said selected surface to said untransformed representation;
   (d) code for transforming the corrected untransformed representation to produce a second integral transform representation and applying to said second integral transform representation a second filter corresponding to the inversion of a second differential operator reflected in the corrected untransformed representation to produce a second modified integral transform representation;
   (e) code for applying an inverse of said second integral transform to said second modified integral transform representation.

* * * * *

UNITED STATES PATENT AND TRADEMARK OFFICE
CERTIFICATE OF CORRECTION

PATENT NO. : 7,039,553 B2
APPLICATION NO. : 10/979554
DATED : May 2, 2006
INVENTOR(S) : Keith Nugent, David Paganin and Anton Barty It is certified that error appears in the above-identified patent and that said Letters Patent is hereby corrected as shown below:

Col. 9, Line 20, Replace "$(/\nabla\perp\emptyset)$" with -- $(I/\nabla\perp\emptyset)$ --

Col. 9, Line 25, Replace "$\partial II \partial z$" with -- $\partial I/\partial z$ --

Col. 9, Line 26, Replace "$\partial II \partial z$" with -- $\partial I/\partial z$ --

Col. 9, Line 33, Replace "$_{195}$" with -- $\perp$ --

Col. 9, Line 39, Replace Subscript "$_{195}$" with -- $\perp$ --

Col. 9, Line 42, Delete "$\partial$"

Col. 11, Line 19, Replace "(I⊥, I_)" with -- (I⊥, - I_) --

Col. 12, Line 6, Delete "$_y$" after "$\nabla$"

Col. 12, Line 55, Replace "$A_1, A_1, A_3,$" with -- $A_1, A_2, A_3$ --

Col. 13, Line 27, Replace "$\phi(x,y)=F^{-1}\Omega 1/I_0 F^{-1}\Omega F\{I_{aberrated}(x,y)-1\}$" with -- (20) $\phi(x,y) = F^{-1}\tilde{\Omega}F\dfrac{1}{I_0}F^{-1}\tilde{\Omega}F\{I_{aberrated}(x,y)-1\}$ --

Col. 15, Line 41, Replace "10" with -- $I_o$ --

Col. 15, Line 46, Replace "dl/dz" with -- dI/dz --

UNITED STATES PATENT AND TRADEMARK OFFICE
CERTIFICATE OF CORRECTION

PATENT NO. : 7,039,553 B2
APPLICATION NO. : 10/979554
DATED : May 2, 2006
INVENTOR(S) : Keith Nugent, David Paganin and Anton Barty It is certified that error appears in the above-identified patent and that said Letters Patent is hereby corrected as shown below:

Col. 15, Line 47, Replace "dl/dz" with -- dI/dz --

Signed and Sealed this

Sixteenth Day of January, 2007

JON W. DUDAS
*Director of the United States Patent and Trademark Office*